(12) United States Patent
Deverakonda Venkata et al.

(10) Patent No.: US 11,297,034 B2
(45) Date of Patent: *Apr. 5, 2022

(54) DEPLOYMENT OF A CUSTOM ADDRESS TO A REMOTELY MANAGED COMPUTATIONAL INSTANCE

(71) Applicant: ServiceNow, Inc., Santa Clara, CA (US)

(72) Inventors: Subbaraya Kumar Deverakonda Venkata, Milpitas, CA (US); Kai Xu, San Jose, CA (US); Scott Kaufmann, San Diego, CA (US); Silas A. Smith, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 182 days.

This patent is subject to a terminal disclaimer.

(21) Appl. No.: 16/716,214

(22) Filed: Dec. 16, 2019

(65) Prior Publication Data

US 2020/0213272 A1 Jul. 2, 2020

Related U.S. Application Data

(63) Continuation of application No. 15/786,124, filed on Oct. 17, 2017, now Pat. No. 10,530,746.

(51) Int. Cl.
*H04L 29/12* (2006.01)
*H04L 61/2503* (2022.01)
(Continued)

(52) U.S. Cl.
CPC ........ *H04L 61/2507* (2013.01); *G06F 16/951* (2019.01); *G06F 16/955* (2019.01);
(Continued)

(58) Field of Classification Search
CPC ............ H04L 61/2507; H04L 61/6068; H04L 61/303; H04L 61/1511; H04L 61/6063;
(Continued)

(56) References Cited

U.S. PATENT DOCUMENTS 6,321,229 B1 11/2001 Goldman
6,578,078 B1 6/2003 Smith et al.
(Continued)

*Primary Examiner* — Ramy M Osman
(74) *Attorney, Agent, or Firm* — Fletcher Yoder PC

(57) ABSTRACT

An example embodiment may include a computational instance and a computing device within a remote network management platform. The computing device may be configured to: receive, from a client device of the managed network, a request to redirect, to a second URL, future requests addressed to a first URL; provide, to the client device, instructions to generate a certificate that binds an identity of the entity that operates the managed network to the first URL; receive, from the client device, the certificate; store the certificate and a corresponding cryptographic key; and generate a mapping between the first URL and the second URL. The computational instance may be configured to, in response to receiving a content request referencing the destination, generate a content response containing content from the destination, where any hyperlinks to the second URL in the content are replaced with hyperlinks to the first URL.

18 Claims, 11 Drawing Sheets

(51) Int. Cl.

| | | |
|---|---|---|
| H04L 101/663 | (2022.01) | |
| H04L 61/5007 | (2022.01) | |
| H04L 67/02 | (2022.01) | |
| H04L 29/06 | (2006.01) | |
| H04L 101/30 | (2022.01) | |
| H04L 101/668 | (2022.01) | |
| G06F 16/955 | (2019.01) | |
| H04L 9/32 | (2006.01) | |
| H04L 61/4511 | (2022.01) | |
| H04L 67/1001 | (2022.01) | |
| H04L 9/08 | (2006.01) | |
| H04L 9/40 | (2022.01) | |
| G06F 16/951 | (2019.01) | |
| H04L 67/1027 | (2022.01) | |
| H04L 61/5076 | (2022.01) | |

(52) U.S. Cl.
CPC .......... *H04L 9/0894* (2013.01); *H04L 9/3268* (2013.01); *H04L 29/06768* (2013.01); *H04L 61/1511* (2013.01); *H04L 61/2007* (2013.01); *H04L 61/303* (2013.01); *H04L 61/6063* (2013.01); *H04L 61/6068* (2013.01); *H04L 63/0815* (2013.01); *H04L 63/0823* (2013.01); *H04L 63/10* (2013.01); *H04L 67/02* (2013.01); *H04L 67/1002* (2013.01); *H04L 61/2076* (2013.01); *H04L 67/1027* (2013.01)

(58) Field of Classification Search
CPC ............. H04L 61/2007; H04L 61/2076; H04L 9/3268; H04L 29/06768; H04L 63/0815; G06F 16/955; G06F 16/901; G06F 16/951

See application file for complete search history.

(56) References Cited

U.S. PATENT DOCUMENTS

| | | | |
|---|---|---|---|
| 6,678,887 B1 | 1/2004 | Hallman | |
| 7,020,706 B2 | 3/2006 | Cates | |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |
| 8,612,408 B2 | 12/2013 | Trinon | |
| 8,646,093 B2 | 2/2014 | Myers | |
| 8,832,652 B2 | 9/2014 | Mueller | |
| 9,064,783 B2 | 6/2015 | Ding | |
| 9,098,322 B2 | 8/2015 | Apte | |
| 9,122,552 B2 | 9/2015 | Whitney | |
| 9,276,869 B2 | 3/2016 | Dodd et al. | |
| 9,294,462 B2 | 3/2016 | Parla et al. | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,578,007 B2 | 2/2017 | Martin et al. | |
| 9,645,833 B2 | 5/2017 | Miller | |
| 9,654,473 B2 | 5/2017 | Miller | |
| 9,742,661 B2 | 8/2017 | Klais | |
| 9,766,935 B2 | 9/2017 | Kelkar | |
| 9,805,322 B2 | 10/2017 | Kelkar | |
| 9,953,105 B1* | 4/2018 | Gupta | H04L 67/02 |
| 10,530,746 B2* | 1/2020 | Deverakonda Venkata | H04L 61/1511 |
| 10,904,314 B2* | 1/2021 | Rice | H04L 67/02 |
| 2003/0177274 A1 | 9/2003 | Sun | |
| 2007/0061465 A1 | 3/2007 | Kim | |
| 2007/0211714 A1 | 9/2007 | Metke et al. | |
| 2009/0070873 A1 | 3/2009 | McAfee et al. | |
| 2009/0193513 A1* | 7/2009 | Agarwal | H04L 63/166 726/15 |
| 2011/0264992 A1* | 10/2011 | Vishria | G06F 16/9566 715/208 |
| 2012/0158969 A1* | 6/2012 | Dempsky | H04L 61/6013 709/226 |
| 2012/0198043 A1 | 8/2012 | Hesketh et al. | |
| 2012/0254429 A1* | 10/2012 | Feng | H04L 61/304 709/225 |
| 2013/0318173 A1 | 11/2013 | Kaplinger et al. | |
| 2014/0082715 A1* | 3/2014 | Grajek | H04L 63/0815 726/8 |
| 2014/0108672 A1 | 4/2014 | Ou et al. | |
| 2014/0304766 A1 | 10/2014 | Livne | |
| 2016/0162701 A1* | 6/2016 | Rosenberg | H04L 61/1511 726/4 |
| 2016/0182441 A1 | 6/2016 | Gupta et al. | |
| 2017/0295132 A1 | 10/2017 | Li et al. | |
| 2017/0318104 A1* | 11/2017 | Angeles | H04L 61/10 |
| 2017/0324800 A1* | 11/2017 | DeLuca | H04L 67/02 |
| 2018/0254896 A1* | 9/2018 | Moysi | H04L 63/0823 |
| 2018/0295134 A1 | 10/2018 | Gupta et al. | |
| 2019/0074982 A1 | 3/2019 | Hughes | |
| 2019/0116153 A1 | 4/2019 | Deverakonda Venkata et al. | |
| 2020/0213272 A1* | 7/2020 | Deverakonda Venkata | H04L 63/0823 |
| 2021/0042368 A1* | 2/2021 | Liu | G06F 16/951 |
| 2021/0120076 A1* | 4/2021 | Sun | H04L 67/1023 |

\* cited by examiner

DEPLOYMENT OF A CUSTOM ADDRESS TO A REMOTELY MANAGED COMPUTATIONAL INSTANCE

CROSS REFERENCE TO RELATED APPLICATIONS

This is a continuation and claims priority to U.S. patent application Ser. No. 15/786,124, filed Oct. 17, 2017, the entire contents of which is herein incorporated by reference.

BACKGROUND

A service provider may offer various applications, services, and other resources to an enterprise. The enterprise may desire to provide to its employees, customers, and other users a uniform theme, appearance, or experience across the resources provided by the service provider on behalf of the enterprise. Different enterprises may desire different software packages, layouts, and color themes, among other possibilities. Therefore, it may be beneficial for the service provider to offer a platform that supports customization of various aspects, visual and technical, of the resources offered by the service provider.

SUMMARY

An enterprise may desire to customize the services and resources provided by a service provider and integrate the services and resources more closely with the enterprise's own service offerings. One aspect of this customization and integration may involve customizing the web addresses (e.g., uniform resource locators (URLs)) that employees or customers of the enterprise use to access the services or resources available from the service provider. Ordinarily, the URLs to these services or resources include therein text that identifies the service provider, rather than the enterprise. Further, resources or services accessed via an encrypted connection are also associated with a security certificate corresponding to the service provider, rather than the enterprise.

The enterprise may instead desire to access the services and resources of the service provider by using URLs that reflect an identity of the enterprise, instead of the service provider. For example, the enterprise may desire to use existing URLs that its customers are familiar with and trust, or generate new URLs that, like the existing URLs, are textually related to the identity of the enterprise. The enterprise may also wish to use its own security certificates for resources or services accessed via encrypted connections so that its users see the enterprise, rather than the service provider, as the trusted party providing the service or resource. This way, the enterprise may present a more uniform experience across the different resources and services directly offered by the enterprise and indirectly offered by the service provider on behalf of the enterprise.

A remote network management platform of a service provider may therefore be configured to allow an enterprise (e.g., a managed network) to use custom URLs to access resources and services available by way of a computational instance of the remote network management platform. Conventionally, reconfiguration of the network to support a custom URL would be performed by network technicians. In reconfiguring the network, the technicians would ensure that the custom URL is routed properly, and that the reconfiguration did not adversely affect other aspects of the remote network management platform. However, such an approach might not be practically scalable as the number of custom URLs requested by enterprises grows.

Therefore, the remote network management platform may provide an interface by way of which the enterprise may map its own custom URLs to applications, web pages, or other resources within the computational interface assigned to the enterprise. The interface may provide the technical benefit of automating the process of reconfiguring aspects of the remote network management platform to support custom URLs as a way to access resources of computational instances within the remote network management platform. Additionally, the operations described herein automate reconfiguration of the computational instances themselves so that any content generated by the instances, which includes therein URLs, is consistent with the custom URLs associated with the computational instance.

Accordingly, a first example embodiment may involve a computational instance of a remote network management platform, where the computational instance is assigned to a managed network. The first example embodiment may also involve a computing device operating a configuration interface within the remote network management platform. The computing device may be configured to receive, by way of the configuration interface and from a client device associated with the managed network, a request to redirect, to a second uniform resource locator (URL), future requests addressed to a first URL, where the first URL is textually related to an entity that operates the managed network, and where the second URL addresses a destination within the computational instance; provide, by way of the configuration interface and to the client device, instructions to generate a certificate that binds an identity of the entity that operates the managed network to the first URL; receive, by way of the configuration interface and from the client device, the certificate; store the certificate and a corresponding cryptographic key on the remote network management platform; and generate a mapping between the first URL and the second URL. The computational instance may be configured to receive, from a second client device, a content request referencing the destination; transmit, to the second client device, the certificate; generate a content response containing content from the destination, wherein any hyperlinks to the second URL in the content are replaced with hyperlinks to the first URL in accordance with the mapping; and transmit, to the second client device, the content response.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
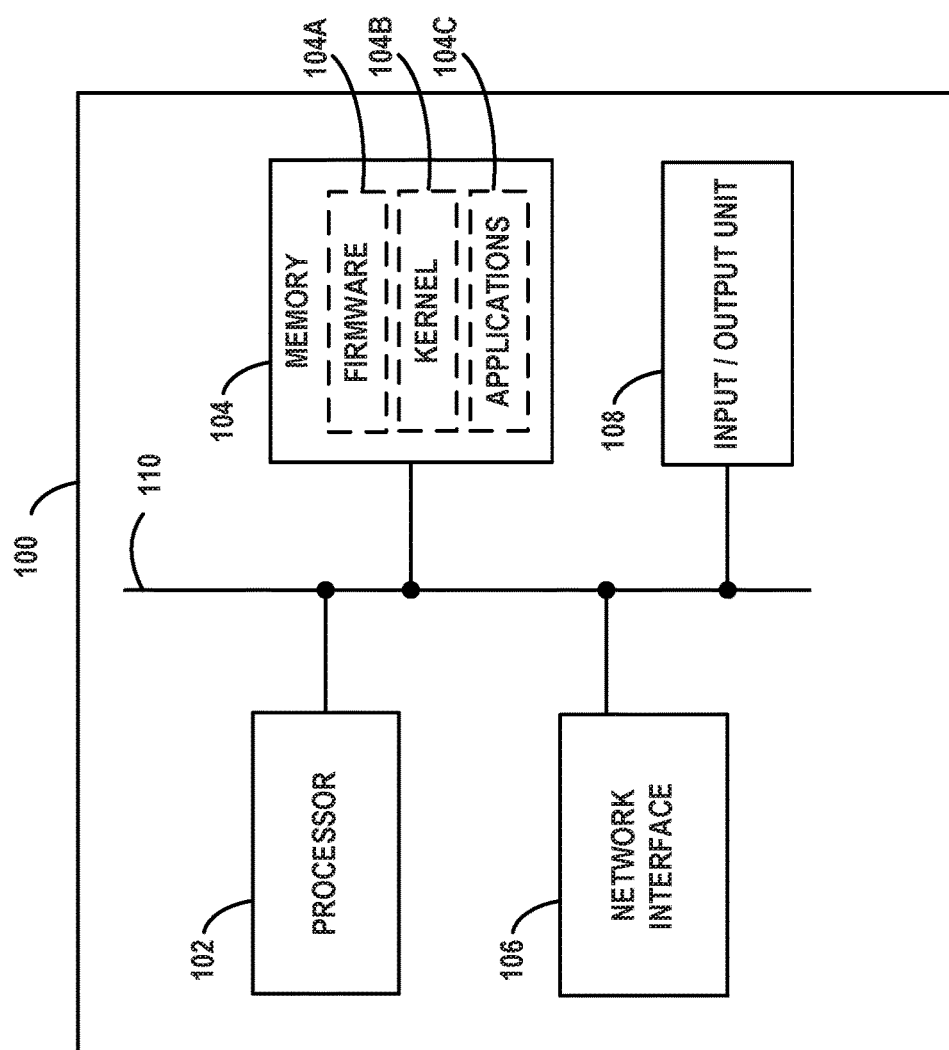
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, tem-plating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
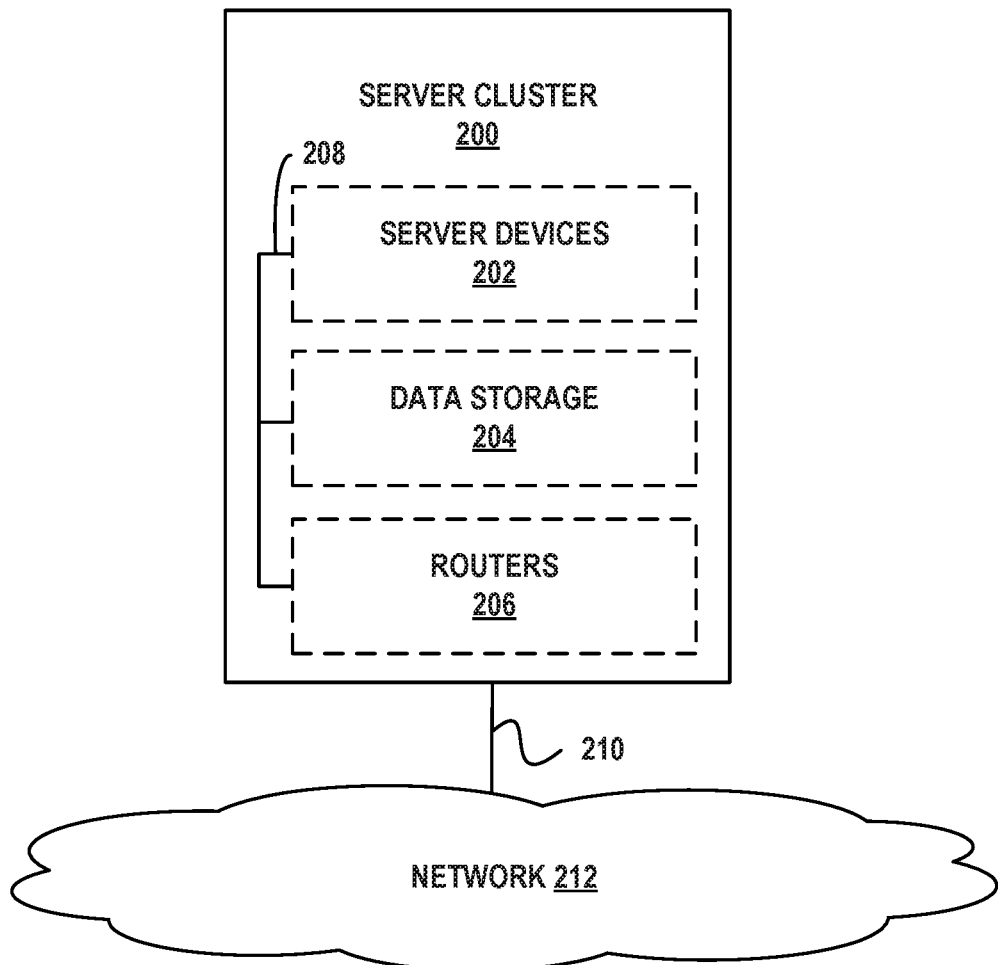
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
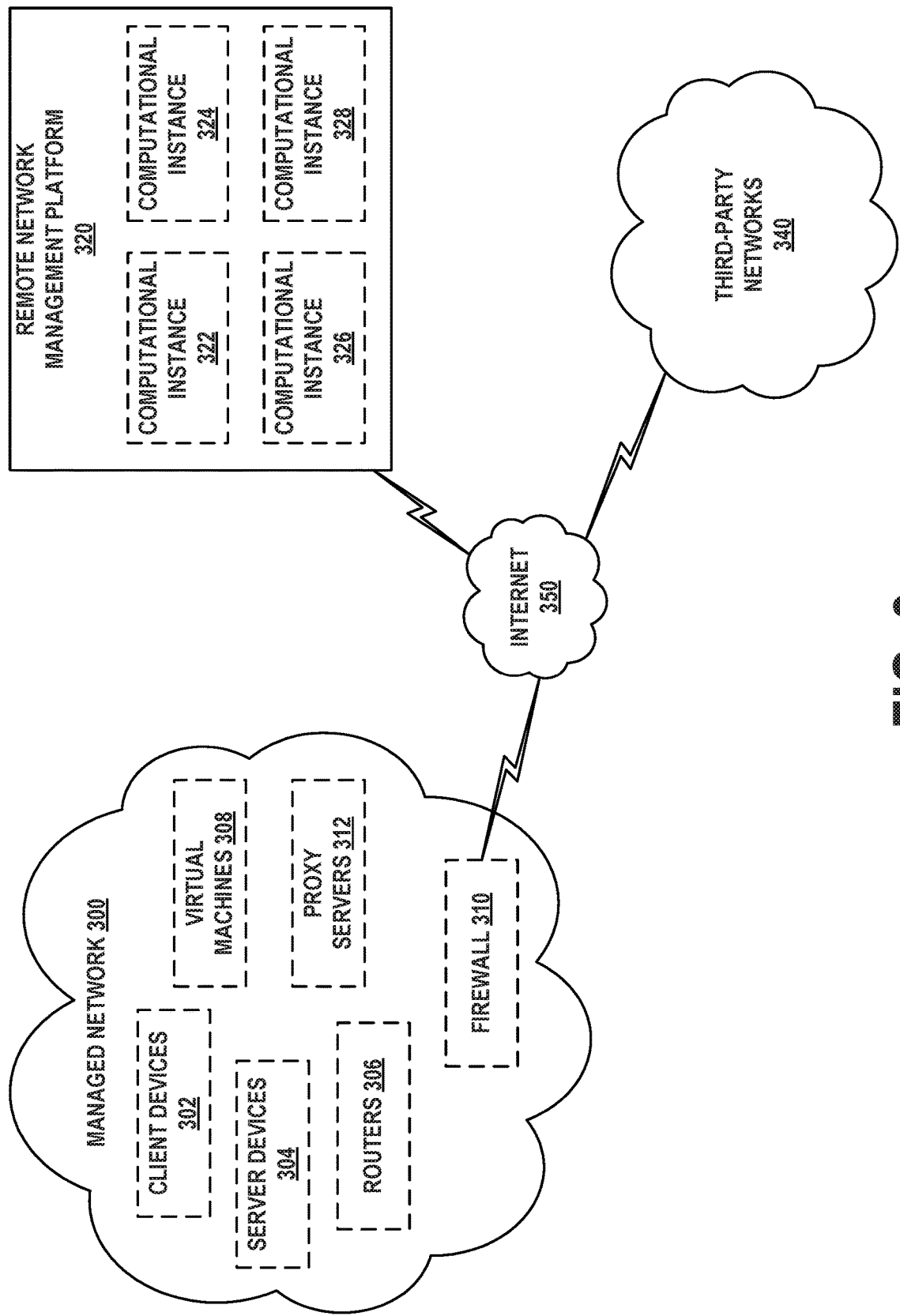
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
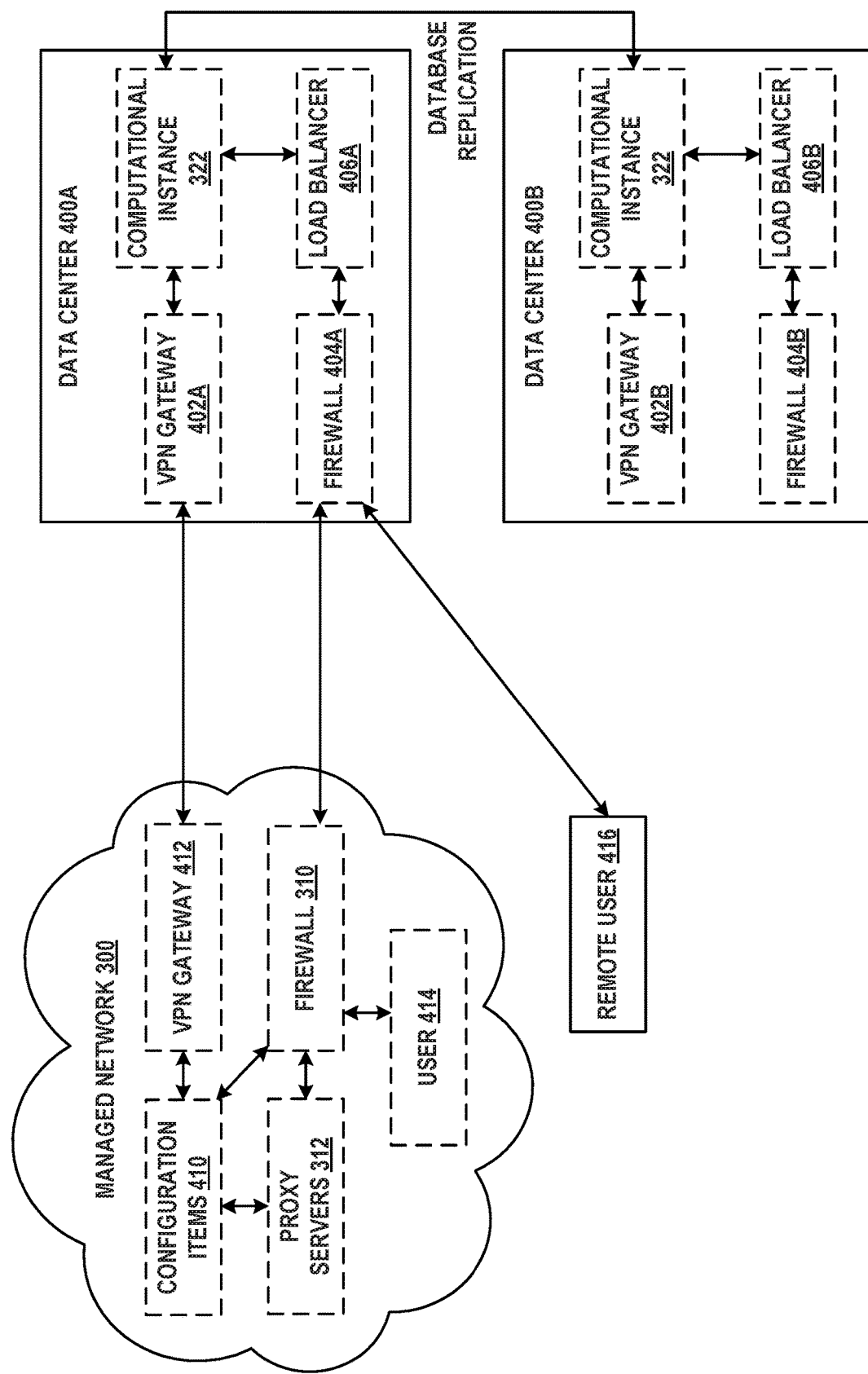
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
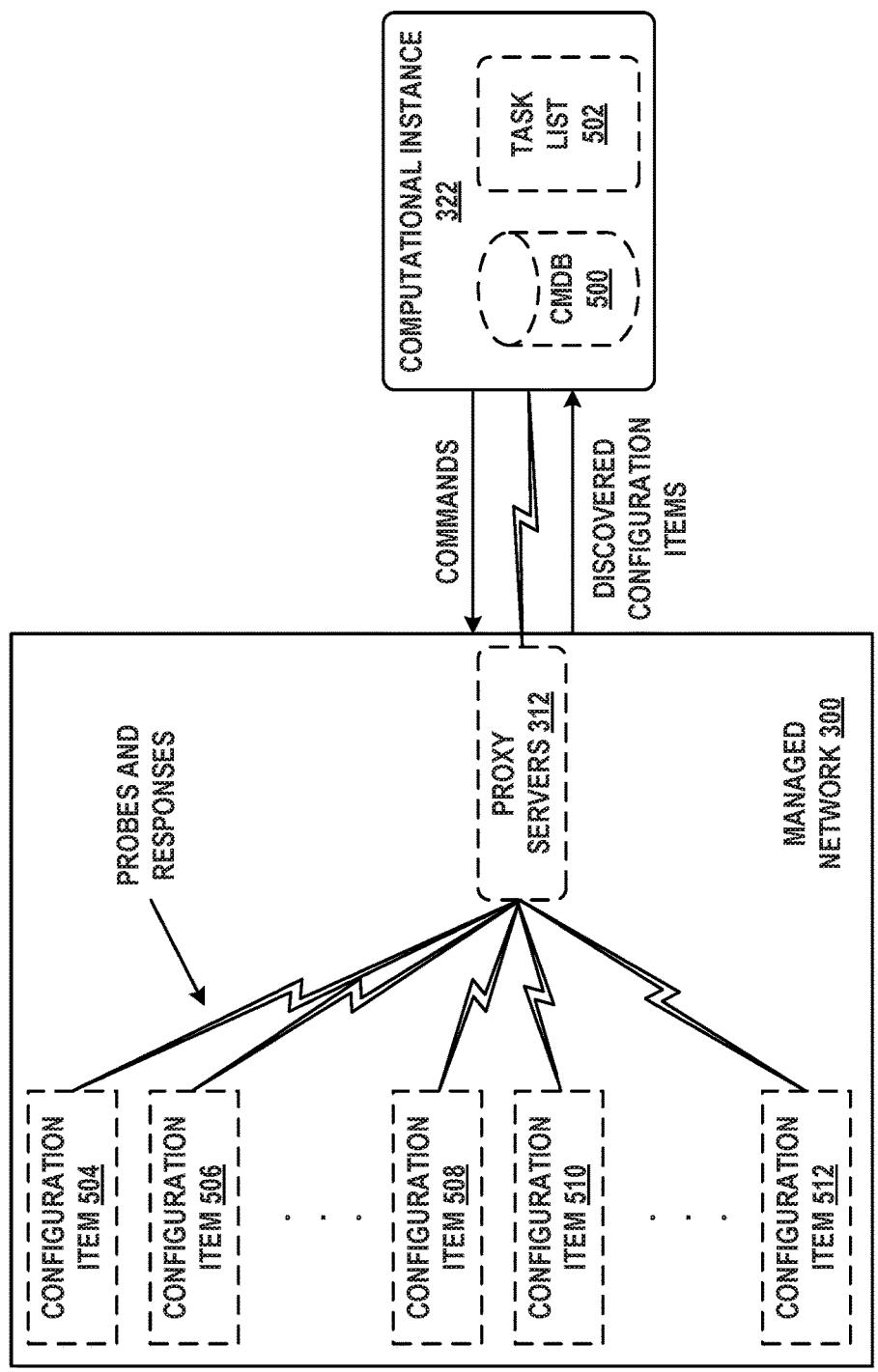
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
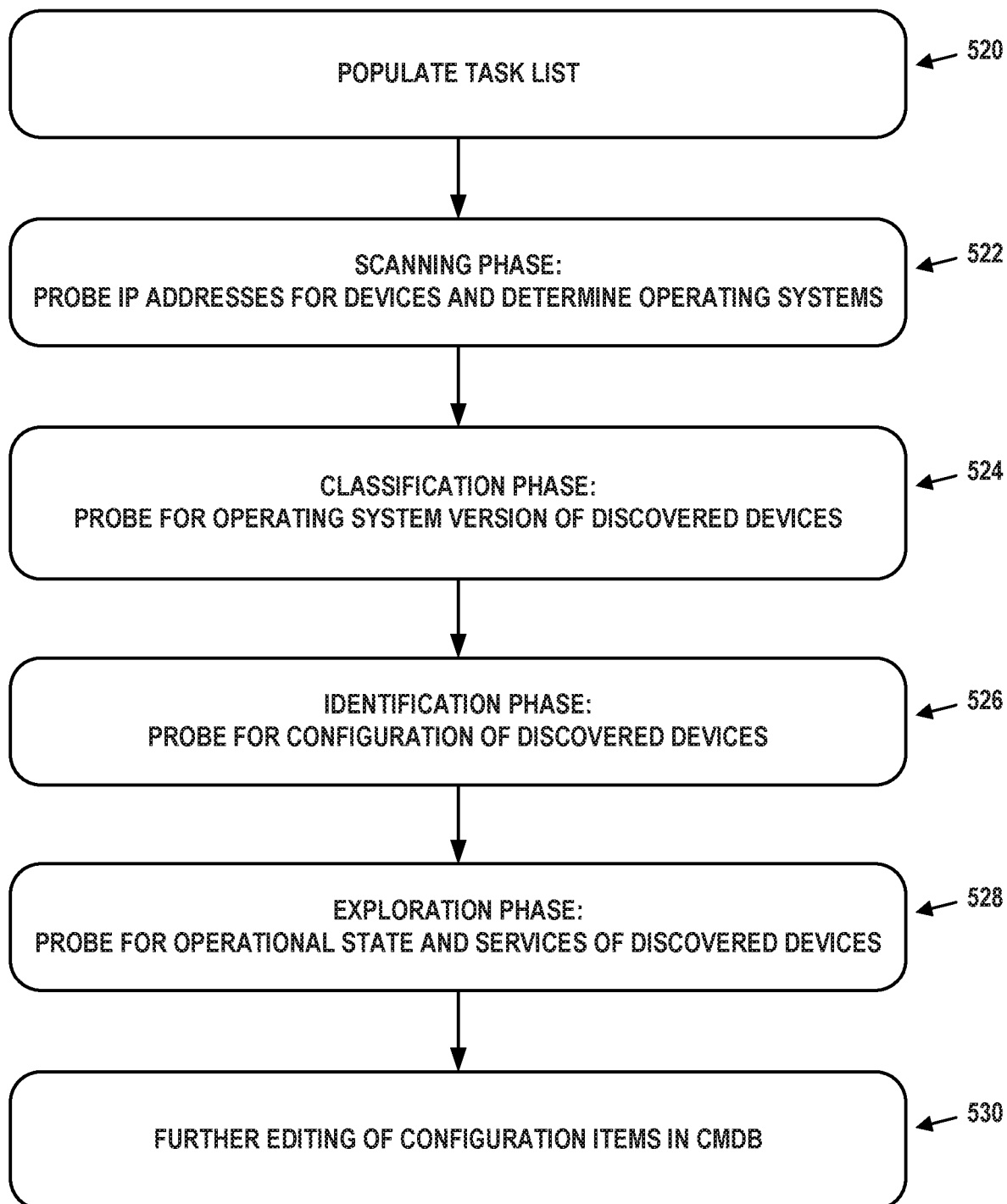
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE CUSTOM URL MAPPING

An enterprise or other entity that operates managed network 300 and utilizes the resources and services provided by remote network management platform 320 may desire to more closely integrate managed network 300 with remote network management platform 320. One aspect of this integration may involve offloading some resources or services from managed network 300 to remote network management platform 320. Another aspect of this integration may involve allowing customers or employees of the enterprise to access additional resources or services provided by remote network management platform 320.

As part of this integration, the enterprise may desire to continue using existing web addresses of managed network 300, or generate new web addresses that are textually consistent with the existing web addresses, to access the resources or services of remote network management platform 320. The enterprise may also desire that accessing the resources and services not reveal that it is actually remote network management platform 320, and not managed network 300, that is providing the resources or services. For example, it may be desirable for a user accessing the resources or services to be shown a web address, and/or a secure socket layer (SSL) certificate or transport layer security (TLS) certificate associated with managed network 300, rather than remote network management platform 320.

Revealing the identity of remote network management platform 320 may be undesirable on several counts. First, users may be unfamiliar and thus not sure whether to trust remote network management platform 320, electing not to use its resources or services for this reason. Second, inconsistencies in the domains and subdomains of web addresses of the various resources and services might make the web addresses difficult to remember and access. Third, the enterprise may desire to present uniform branding across all web addresses associated with the enterprise, and might thus be reluctant to offload services to or take advantage of additional services provided by remote network management platform 320.

Remote network management platform 320 may therefore be configured to support custom web addresses and allow requests (e.g., hypertext transfer protocol requests) to be redirected from managed network 300 to a corresponding computational instance within remote network management platform 320, or proceed directly to the computational instance, without exposing the identity of remote network management platform 320. Thus, resources and services provided by remote network management platform 320 may be accessed via custom URLs that appear to address destinations within managed network 300. Remote network management platform 320 may further be configured to present the custom URLs, instead of the actual URLs, in any responses or content provided in response to requests.

Figure 6:
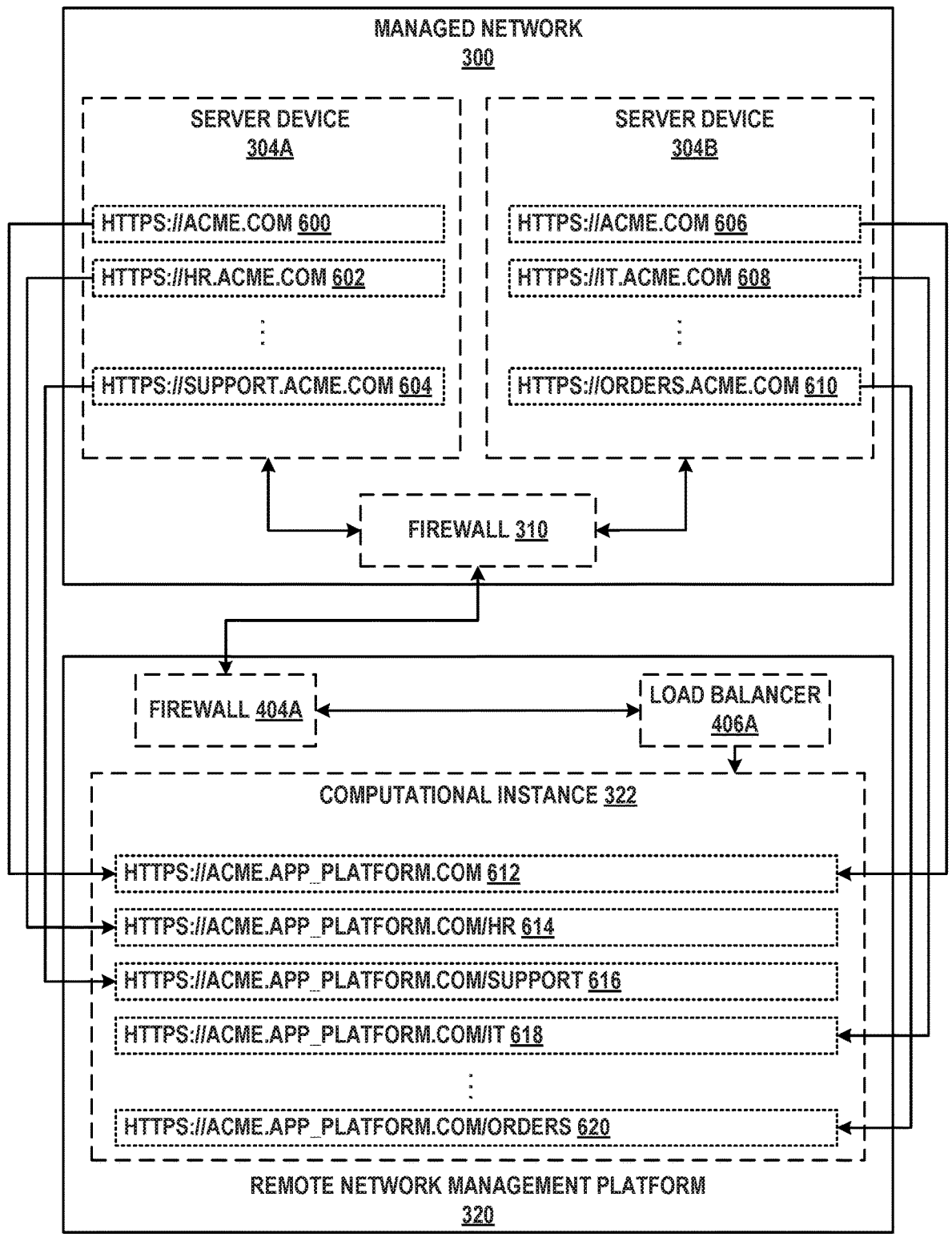
FIG. 6 depicts an address mapping for a remote network management architecture, in accordance with example embodiments.

FIG. 6 illustrates an example URL redirection arrangement that may be implemented between managed network 300 and remote network management platform 320. In particular, managed network 300 may include therein server devices 304A and 304B situated behind firewall 310. Remote network management platform 320 may include therein computational instance 322 assigned or otherwise associated with managed network 300 and situated behind firewall 404A. Remote network management platform 320 may also include load balancer 406A situated behind firewall 404A and configured to distribute incoming requests among server devices within computational instance 322.

Server devices 304A and 304B may be two of server devices 304 shown in FIG. 3. Each of server devices 304A and 304B may host a plurality of resources or services (e.g., websites, applications, or other web-accessible software) addressed by corresponding URLs 600, 602, 604, 606, 608, and 610, among others. The URLs may be textually related to an entity that operates managed network 300. That is, the URLs string (i.e., series of symbols) may include therein text that identifies the enterprise of managed network 300. For example, when the enterprise is the fictional "ACME Corporation," the URLs may include therein the word "ACME" as, for example, the second-level domain of the URLs.

Thus, server device 304A may host a home webpage 600 addressed by HTTPS://ACME.COM, a human resources webpage 602 addressed by HTTPS://HR.ACME.COM, and a customer support webpage 604 addressed by HTTPS://SUPPORT.ACME.COM. Similarly, server device 304B may host a duplicate of the home webpage 606 HTTPS://ACME.COM, an information technology (IT) support webpage 608 addressed by HTTPS://IT.ACME.COM, and a webpage 610 for managing customer orders addressed by HTTPS://ORDERS.ACME.COM. The home page 600/606 might be accessed frequently and may therefore be duplicated across both server devices 304A and 304B.

The destinations, resources, or services addressed by URLs 600-610 may be mapped to corresponding destinations, resources, or services 612-620 within computational instance 322, as indicated by respective arrows. Remote network management platform 320 may be configured to, in response to receiving a request addressed to one of URLs 600-610, perform a redirection to a corresponding one of URLs 612-620, and return its content.

Specifically, the address of home page 600/606 may be mapped to HTTPS://ACME.APP_PLATFORM.COM, indicated by 612, and address a landing or home page for "ACME Corporation" within computational instance 322 of remote network management platform 320. The address of human resources webpage 602 may be mapped to HTTPS://ACME.APP_PLATFORM.COM/HR, indicated by 614, and address a corresponding human resources webpage or software within computational instance 322. The address of customer support page 604 may be mapped to HTTPS://ACME.APP_PLATFORM.COM/SUPPORT, indicated by 616, and address a corresponding customer support page within computational instance 322. The address of IT support page 608 may be mapped to HTTPS://ACME.APP_PLATFORM.COM/IT, indicated by 618, and address a corresponding IT support page within computational instance 322. The address of customer orders management webpage 610 may be mapped to HTTPS://ACME.APP_PLATFORM.COM/ORDERS, indicated by 620, and address a corresponding customer orders page or software within computational instance 322.

Although FIG. 6 illustrates example mappings between subdomains of ACME.COM and destinations within computational instance 322, the same mappings may also be implemented when the content of the subdomains is stored as subdirectories of the ACME.COM domain. For example, HTTPS://ACME.COM/HR, instead of HTTPS://HR.ACME.COM, may be mapped to HTTPS://ACME.APP_PLATFORM.COM/HR.

Furthermore, multiple levels of subdomains and subdirectories may be supported.

In some implementations, multiple URLs associated with managed network 300 may be mapped to a single URL within computational instance 322. For example, both the customer support webpage 604 HTTPS://SUPPORT.ACME.COM and the IT support webpage 608 HTTPS://IT.ACME.COM might be mapped to a single, consolidated support page (e.g., HTTPS://ACME.APP_PLATFORM.COM/SUPPORT).

Further, in some instances, the destinations in managed network 300 addressed by URLs 600-610 might not hold any content. Similarly, in some implementations, there might not be any destinations in managed network 300 addressed by one or more of URLs 600-610, which might instead directly address the corresponding destinations within computational instance 322. That is, the URLs 600-610 might only be available for the purpose of allowing the resources or services addressed by URLs 612-620 to be accessed via custom URLs that are textually related to the enterprise operating managed network 300.

VI. EXAMPLE DEPLOYMENT OF CUSTOM URLS IN A REMOTE NETWORK MANAGEMENT PLATFORM

Figure 7:
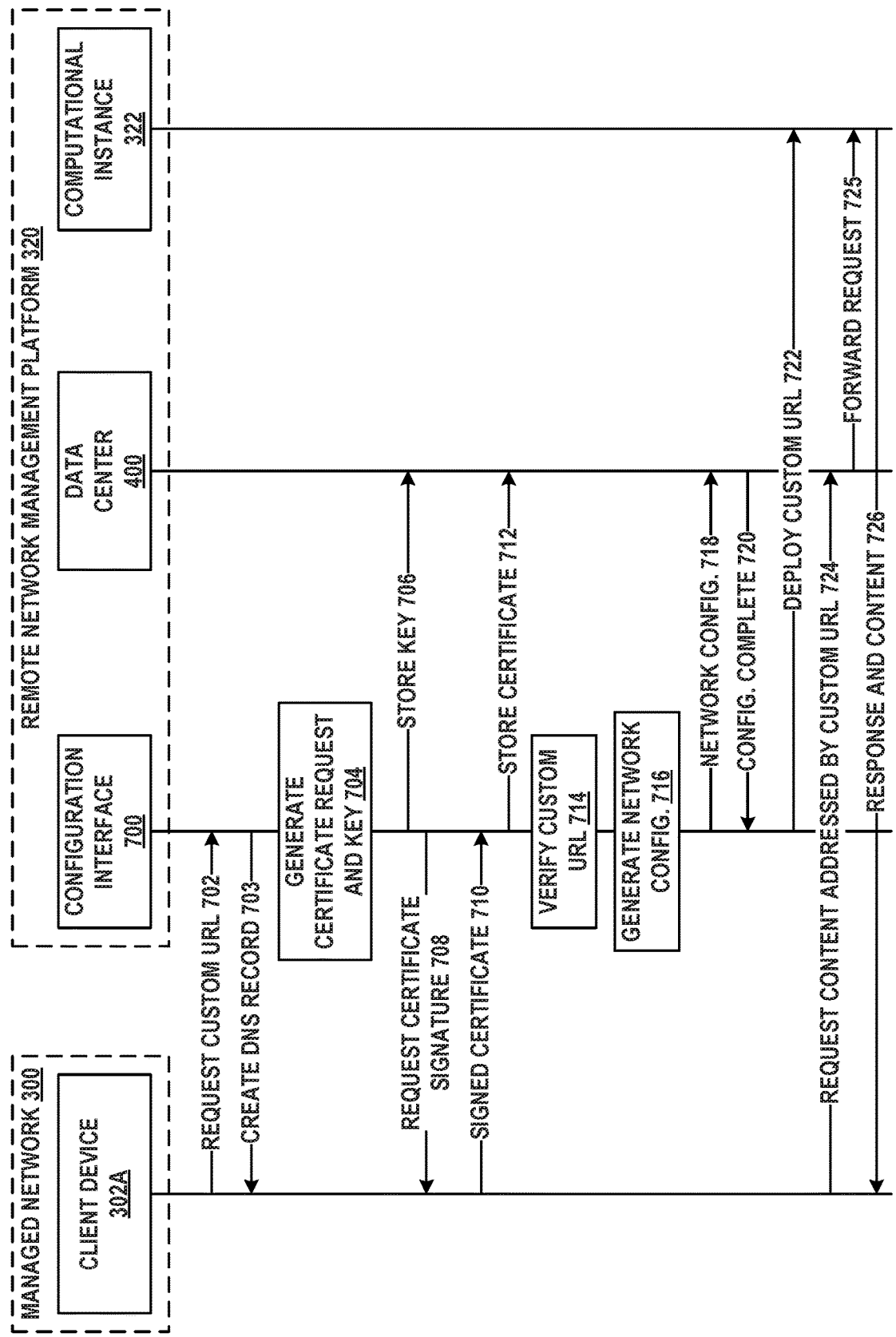
FIG. 7 is a message diagram, in accordance with example embodiments.

FIG. 7 illustrates an example process for implementing the custom URL mapping illustrated in FIG. 6. Client device 302A associated with managed network 300 may communicate with a configuration interface 700, operated by one or more computing devices within remote network management platform 320, to set up the custom URL mapping. Configuration interface 700 may communicate with data center 400 and computational instance 322 to configure remote network management platform 320 to handle the custom URL redirection.

In some implementations, client device 302A may be a client device within managed network 300 (e.g., one of client devices 302 shown in FIG. 3). Alternatively, client device 302A may be a device associated with a remote user of managed network 300 (e.g., remote user 416 shown in FIG. 4). Configuration interface 700 may be a computational instance within remote network management platform 320 by way of which an enterprise may communicate with remote network management platform 320 to structure custom URL mappings according to its needs. Data center 400 may include computing hardware, as well as a further computational instance configured to provide an interface between the computing hardware and other computational instances (e.g., configuration interface 700). Data center 400 may store settings, configurations, and mappings that implement the network connectivity of remote network management platform 320. In some embodiments, data center 400 may include data centers 400A and 400B having stored thereon computational instance 322, as shown in FIG. 4.

Client device 302A may initiate the custom URL configuration process by providing a request to configure a custom URL to configuration interface 700, as indicated by arrow 702. The request may seek to redirect future requests addressed to a first URL to a second URL. The first URL may be textually related to an entity of managed network 300, while the second URL may address a destination within computational instance 322. In some implementations, the first URL may address a destination within managed network 300. A graphical user interface of configuration interface 700 may facilitate the process of obtaining all the requisite information needed to configure the custom URL.

In response to receiving the request at 702, configuration interface 700 may provide instructions to client device 302A to create a record (e.g., CNAME record, A record, ALIAS record) on a server of a domain name system (DNS) which managed network 300 uses to resolve its URLs to internet protocol (IP) addresses, as indicated by arrow 703. The record may indicate that the first URL is mapped to the second URL (e.g., CNAME record or ALIAS record) and may thus cause servers of the DNS to, in response to receiving a request to determine an IP of the first URL, search for an IP address associated with the second URL. Alternatively, the record may directly indicate an IP address associated with the first URL (e.g., "A" record), where the IP address corresponds to the destination addressed by the second URL. The instructions to create the record may indicate to a user to manually reconfigure the DNS record. Alternatively, the instructions may create the record automatically, via, for example, an application programming interface (API) offered by the DNS provider. Thus, in some embodiments, the instructions may be provided to the API of the DNS, rather than to client device 302A. Generally, these DNS-level modifications may modify network parameters external to remote network management platform 320, although the modifications may be considered internal where network management platform uses its own DNS servers.

Further, in response to receiving the request at 702, configuration interface 700 may generate a cryptographic key and a certificate signing request (CSR) at 704. The CSR may be a message to a certificate authority (CA), a third-party identity validation service, requesting issuance and validation of a digital identity certificate. The digital identity certificate may be, for example, a secure socket layer (SSL) or Transport Layer Security (TLS) certificate. The digital identity certificate may bind an identity of the entity that operates managed network 300 (e.g., ACME Corporation) to the first URL (e.g., HTTPS://ACME.COM) for which redirection is requested. In some implementations, the digital identity certificate may also bind the identity of the entity to subdomains of the first URL. In response to connection requests addressed to the first URL, the digital identity certificate may be presented by remote network management platform 320 in order to validate or confirm that content of the first URL is provided by a trusted party.

The cryptographic key may include a private key and a public key, both of which may be stored in data center 400, as indicated by arrow 706. As the names suggest, the public key may be shared with client devices by remote network management platform 320, while the private key should not be shared. The CSR may be signed by the private key (i.e., include therein a string of text encrypted with the private key) and may include therein the public key.

At 708, configuration interface 700 may provide the CSR to client device 302A and request that the entity of managed network 300 obtain a valid digital identity certificate form a CA using the CSR. The CSR may include therein the requisite information for obtaining a digital identity certificate, including a Distinguished Name (i.e., the fully qualified domain name to be secured, e.g., WWW.ACME.COM), a business or organization name (e.g., "ACME Corporation"), an address of the business or organization, and an email address to be used for identity verification. Configuration interface 700 may receive this requisite information in the custom URL configuration request at 702.

The entity of managed network 300 may provide the CSR to a CA and, after verification of the entity's identity, obtain a signed (i.e., verified or authenticated) digital identity certificate. Client device 302A may then transmit this signed certificate to configuration interface 700, as indicated by arrow 710. Configuration interface 700 may store the signed certificate in data center 400, as indicated by arrow 712.

The generated cryptographic key and the digital identity certificate may allow for secure communications over the internet. The digital identity certificate may confirm to visitors of a website that the website administrator's identity has been verified by a third-party CA. The cryptographic key may allow messages encrypted with the public key to be decrypted only with the private key, and vice versa. Thus, the public key and the digital identity certificate may be presented by remote network management platform 320 in response to connection requests addressed at the first URL. Data sent to remote network management platform 320 over the established connection may be encrypted with the public key and may therefore only be decrypted using the private key. In some implementations, the private and public key pair may be used to generate a symmetric session key that allows for faster encryption and decryption of communications between server and client.

Notably, although the requests addressed to the first URL will ultimately return content addressed by the second URL from within computational instance 322 of remote network management platform 320, the digital identity certificate does not bind the identity of the entity that operates remote network management platform 320 to the first URL. Rather, the digital identity certificate binds an identity of the entity that operates managed network 300 to the first URL. Thus, whenever a client device requests content addressed by the first URL, and ultimately receives content addressed by the second URL, it is the entity of managed network 300, and not the entity of remote network management platform 320, that is presented to the client as the trusted entity responsible for providing the content.

The requested custom URL (i.e., the first URL) may be verified by configuration interface 700, as indicated at block 714. The verification may include ensuring that the DNS resolves the first URL to an internet protocol (IP) address of remote network management platform 320, rather than managed network 300. The verification may also include parsing the signed digital identity certificate to determine whether the certificate includes all the requisite information about the entity of managed network 300.

When parameters of the requested custom URL have been successfully verified, configuration interface 700 may proceed to generate a mapping between the first URL and the destination within computational instance 322 addressed by the second URL. Configuration interface 700 may generate a network configuration indicating how to adjust a plurality of network parameters such that incoming requests addressed at the first URL are routed by remote network management platform 320 to the destination within computational instance 322 addressed by the second URL. The network configuration or mapping may indicate how to route a request addressed at the first URL through remote network management platform 320 such that it arrives at the destination within computational instance 322 addressed by the second URL.

The destination within computational instance 322 addressed by the second URL may be a server device or a server cluster within remote network management platform 320. The network configuration may therefore include internal (private) IP addresses for each of the servers, as well as a public IP assigned to a load balancer for the server devices.

Configuration interface 700 may provide network configuration instructions to data center 400 to reconfigure the network according to the determined network configuration, as indicated by arrow 718. This may include assigning server devices to host computational instance 322, if not already assigned, and reconfiguring one or more load balancers within remote network management platform 320 to distribute future requests sent to the IP address mapped to the second URL to the server devices hosting computational instance 322 in remote network management platform 320. When the network has been reconfigured, data center 400 may provide an acknowledgement indicating completion of the reconfiguration, as indicated by arrow 720. These network parameter modifications may be internal to remote network management platform 320.

With the network reconfigured, configuration interface 700 may provide instructions 722 to computational instance 322 that cause computational instance 322 to respond to future requests addressed to the first URL with content addressed by the second URL. In other words, computational instance 322 may be configured to recognize requests addressed to the first URL, and respond with corresponding content. Instructions 722 may cause computational instance 322 to store an association between the first URL and a file system path to the destination within the computational instance addressed by the second URL. When computational instance 322 receives a request addressed to the first URL, computational instance 322 may reference the first URL at the stored association to determine the content to return in response to the request.

Once the network configuration in completed, client device 302A, or another authorized client device in or outside of managed network 300, may send a request for content addressed to the first URL, as indicated by arrow 724. The request may be received by data center 400 of remote network management platform 320, and routed or forwarded to computational instance 322 according to the determined mapping, as indicated by arrow 725. Although the request may be addressed to an IP address associated with remote network management platform 320, an HTTP host header within the HTTP request for content may be used to determine that the request was initially addressed to the first URL. Specifically, computational instance 322 may determine that the request was initially addressed to the first URL by reading the HTTP host header of the HTTP request. The HTTP host header may be populated with the first URL by client device 302A (or another client device requesting content) when the HTTP request is generated.

In response to receiving the request for content, computational instance 322 may generate and transmit corresponding content (i.e., the content addressed by the second URL). Any links to the second URL contained within the corresponding content may be replaced by links to the first URL. In some implementations, any other links within the corresponding content that have custom URLs mapped thereto may also be replaced by links representing the corresponding custom URLs.

Particularly, computational instance 322 may be configured to parse the corresponding content for links and perform the replacement according to the custom URL which was used to request the corresponding content and the entity associated therewith. Before transmitting the content, computational instance 322 may, for any link within the corresponding content, determine whether a corresponding custom URL has been set up by the entity. Computational instance 322 may transmit the content to client device 302A after replacing any links with the corresponding custom URLs.

Similarly, any electronic communications (e.g., email) generated by computational instance 322 may have any links included therein replaced by corresponding custom URLs. For example, password reset links generated by computational instance 322 may be based on the custom URLs set up for managed network 300. For example, HTTPS://ACME.APP_PLATFORM.COM/PASSWORDRESET.DO?VAR_1=X& VAR_2=Y may be replaced with HTTPS://ACME.COM/PASSWORDRESET.DO?VAR_1=X& VAR_2=Y by replacing "ACME.APP_PLATFORM.COM" (i.e., the relevant portion of the actual URL) with the "ACME.COM" (the relevant portion of the custom URL).

Further, in some instances, any other content, including text, images, or video, associated with an entity of remote network management platform 320 and generated on behalf of the entity of managed network 300 may be replaced by alternative content associated with the entity of managed network 300. Computational instance 322 may, in response to receiving a request addressed at a custom URL, parse the corresponding content and perform the replacement before transmitting the corresponding content back to the client device. Thus, any content provided by remote network management platform 320 on behalf of managed network 300 may be modified to appear as if it were actually provided by managed network 300 or an entity thereof. Accordingly, resources and services provided by remote network management platform 320 may conform in theme, appearance, or style to those of managed network 300. These content replacement operations may be performed by an API internal or external to computational instance 322, or by computational instance 322 directly.

In some instances, search engine providers may penalize a search ranking of a website when it is detected that the website is attempting to artificially inflate the ranking through a dishonest optimization method. Having multiple URLs link to the same content might be considered a dishonest optimization method by some search engine providers. Thus, in order to ensure that the use of custom URLs does not adversely affect the search engine rankings of a website, computational instance 322 may also include, in the corresponding content, metadata or other content indicating that the same content is accessible via multiple URLs and that only one of the URLs should be indexed. For example, the metadata may cause a search engine web crawler to omit indexing content addressed by the second URL and redirect the search engine web crawler to index content addressed by the first URL, or vice versa.

Figure 8:
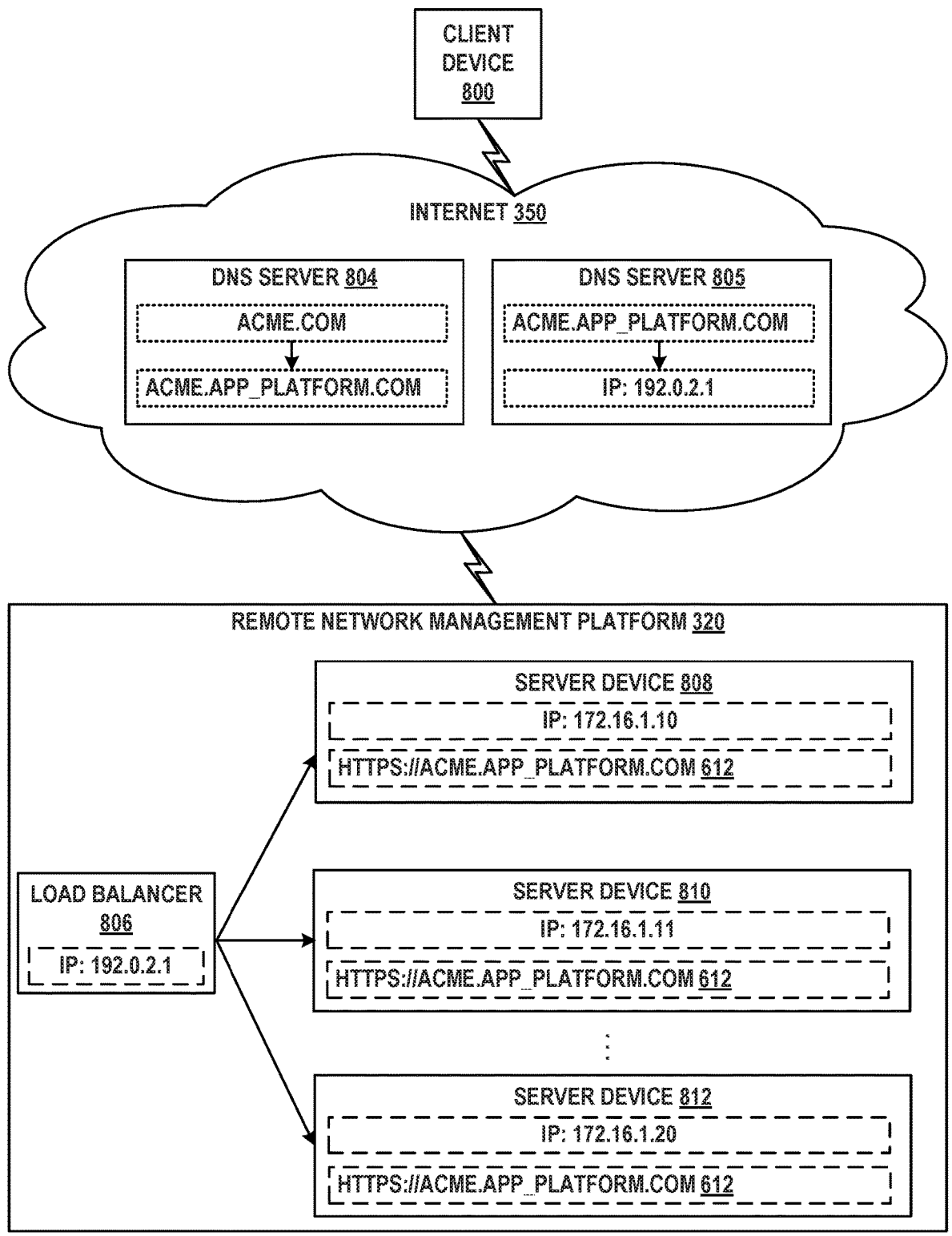
FIG. 8 depicts an address routing, in accordance with example embodiments.

FIG. 8 illustrates how an example request (e.g., HTTP request) addressed to the first URL may be rerouted to a destination within a computational instance addressed by the second URL. The DNS lookup may be issued by client device 800 and may be routed first to DNS server 804, and then to DNS server 805. Client device 800 may be a device within, associated with, or external to managed network 300. DNS servers 804 and 805 may aid in translating the first URL into a corresponding IP address identifying the destination addressed by the second URL at which the requested content resides.

In one implementation, the DNS record corresponding to the first URL may include a CNAME record or an ALIAS record associating the first URL (e.g., ACME.COM) with the second URL (e.g., ACME.APP_PLATFORM.COM). A name server of the DNS may, in response to the request from a DNS client on client device 800, initiate a first query for the first URL. When the CNAME or ALIAS record corresponding to the first URL is found on DNS server 804, the DNS client on computing device 800 or the DNS name server may start a second query for the second URL identified by the CNAME or ALIAS record. In response to finding the entry corresponding to the second URL and the IP address associated therewith on DNS server 805, the name server of the DNS may return the IP address 192.0.2.1 to client device 800. Thus, the CNAME or ALIAS record may operate to direct requests addressed at the first URL to remote network management platform 320, instead of to managed network 300.

The CNAME or ALIAS record may be used when remote network management platform 320 is unable to directly and automatically manage the DNS record associated with the first URL. For example, the CNAME or ALIAS record may be used when managed network 300 relies on a third-party DNS provider. Alternatively, some implementations may use an "A" record to point the first URL directly to the IP address associated with the second URL (e.g., the record for ACME.COM on DNS server 804 may point directly to 192.0.2.1). Thus, one DNS query may be sufficient to resolve ACME.COM into the corresponding IP address. An "A" record may be used where remote network management platform 320 is able to automatically update the record as the IP address corresponding to the second URL changes (e.g., when remote network management platform 320 manages DNS server 804).

Client device 800 may, via internet 350, send a request for content addressed to the IP address returned by DNS server 804 or 805. Based on the IP address, the request may be routed to load balancer 806 within remote network management platform 320, rather than to managed network 300. Load balancer 806 may route the request for the first URL to one of server devices 808 or 810-812 based on the respective loads experienced by each device.

VII. EXAMPLE AUTHENTICATION FOR CUSTOM URLS

Figure 9:
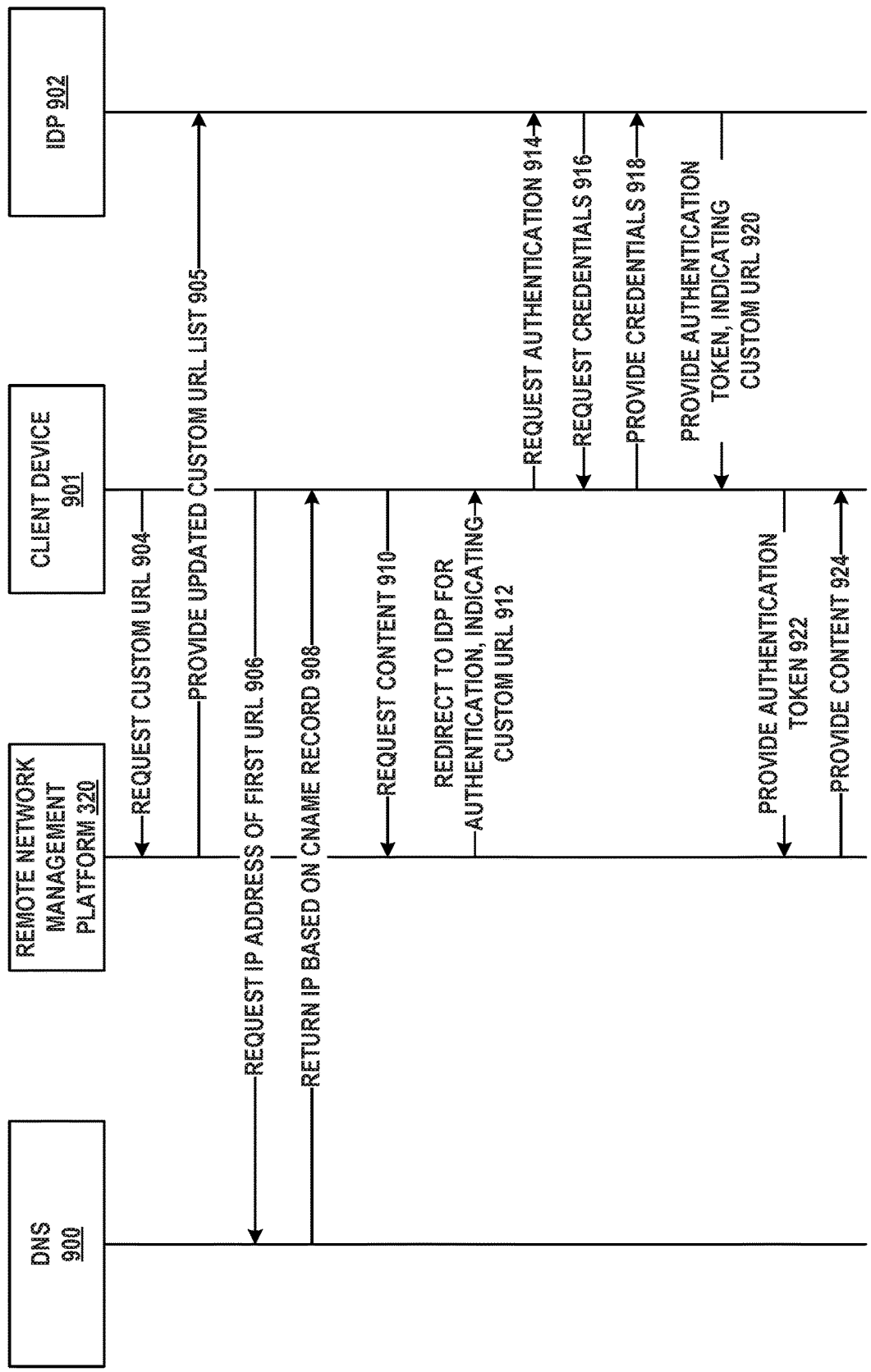
FIG. 9 is a message diagram, in accordance with example embodiments.

FIG. 9 illustrates example operations for supporting single sign on (SSO) authentication in combination with the custom URL redirection described above. SSO authentication allows a user to access a plurality of different services and resources, often including independent software systems, using a single username and password. Thus, SSO authentication may allow users of managed network 300 to access the resources and services of remote network management platform 320 using a single username and password. Users might only have to input their user name and password once for each session, without having to reenter these credentials each time they switch to a different resource or service. In some embodiments, SSO authentication may utilize the Security Assertion Markup Language (SAML) standard.

SSO relies on an identity provider (IdP) 902 to authenticate user credentials. IdP 904 may be an entity that creates, maintains, and manages identity information for users within managed network 300 and provides authentication services to resources and services within remote network management platform 320. In some implementations, IdP 902 may be a third-party identity provider. Alternatively, IdP 902 may be implemented as part of remote network management platform 320 or managed network 300.

In order to support SSO authentication for custom URLs, remote network management platform 320 may, in response to receiving a request from client device 901 to set up a custom URL, as indicated by arrow 904, transmit an indication of the custom URL to IdP 902, as indicated by arrow 905. The custom URL may be provided as part of a larger list of custom URLs that remote network management platform 320 recognizes, and for which IdP 902 is to provide authentication. Informing IdP 902 of the list of custom URLs allows IdP 902 to properly authenticate requests involving the custom URLs and provide with each authentication response an indication of the custom URL which a user attempted to access, resulting in initiation of the SSO authentication process.

Client device 901 may initiate the SSO authentication process by requesting content addressed by the first URL. The first URL may need to be resolved into an IP address and thus client device 901 may request, using one or more queries to DNS 900, the IP address corresponding to the first URL (i.e., the IP address referenced by the second URL, which is in turn referenced by the first URL), as indicated by arrow 906. DNS 900 may return the IP address of remote network management platform 320 (i.e., the IP associated with the second URL), as indicated by arrow 908. Client device 901 may thus transmit the request for content to remote network management platform 320 addressed by the IP address, as indicated by arrow 910, and described with respect to FIG. 8.

Remote network management platform 320 may, in response to receiving the request for content from client device 901, determine that client device 901 needs to authenticate itself before being allowed to access the requested resources or services. Remote network management platform 320 may transmit, to client device 901, a response configured to redirect client device 901 to IdP 902 for authentication, as indicate by arrow 912. The response may include therein a call-back URL (i.e., the custom URL which client device 901 used to request content, thus prompting the authentication request) to which the authentication response from IdP 902 should be addressed. Remote network management platform 320 may determine the call-back URL based on, for example, the HTTP host header identifying the first URL and included with the request for content at 910.

By including the custom URL as the call-back URL, both the authentication request and authentication response may be processed using the same guest session between client device 901 and remote network management platform 320 (e.g., using the same server device), thus allowing the authentication response to be properly mapped to the corresponding authentication request. Mapping of the authentication response to the authentication request may be further facilitated by using other identifying variables in the authentication request and authentication response, as well as by configuring any load balancers for persistence-based load balancing (e.g., "sticky sessions" in which all requests associated with a particular client session are directed to a single server device).

In response to receiving, from remote network management platform 320, the instructions to redirect to IdP 902, client device 901 may transmit, to IdP 902, a request for authentication 914. IdP 902 may determine whether the custom URL to which the authentication response is to be returned is part of the updated list of custom URLs for which IdP 902 is to provide authentication. If the custom URL is recognized by IdP 902, IdP 902 may transmit to client device 901 a request for credentials, as indicated by arrow 916. The request for credentials may include a web form by way of which the credentials are to be provided. Alternatively, in some embodiments, IdP 902 may wait to verify the custom URL until after client device 901 has provided login credentials.

Client device 901 may, in response to the request for credentials, provide the requested credentials to IdP 902, as indicated by arrow 918. IdP 902 may validate the provided credentials and, if they are valid, IdP 902 may transmit to client device 901 an authentication token (i.e., a file) whose contents indicate that client device 901 has been successfully authenticated, as indicated by arrow 920. The authentication token may expire, for example, after a predetermined time (e.g., 8 hours) thus requiring the authentication procedure to be repeated by client device 901. IdP 902 may also include along with the token the custom URL to which the authentication response and token should be provided so that the authentication response can be handled by the same session or server device responsible for maintaining the session between client device 901 and remote network management platform 320.

In response to receiving the authentication token, client device 901 may transmit the authentication token to remote network management platform 320 to authenticate itself, as indicated by arrow 922. When remote network management platform 320 receives the authentication response and token, it may route the authentication response to the appropriate server device based on the custom URL and session variables indicated therein (e.g., using persistence-based load balancing). Remote network management platform 320 may determine that the authentication token has been issued by a trusted IdP and respond to the request for content transmitted at 910 by providing corresponding content, as indicated by arrow 924.

Further requests for content transmitted from client device 901 to remote network management platform 320 might not require the repeated authentication for as long as the authentication token remains valid. Repeated authentication might not be required regardless of whether the requests are addressed at the first URL, at another custom URL, or at a URL directly addressing a resource or service within remote network management platform 320, provided that client device 901 has access privileges to the requested resources.

VIII. EXAMPLE OPERATIONS

Figure 10:
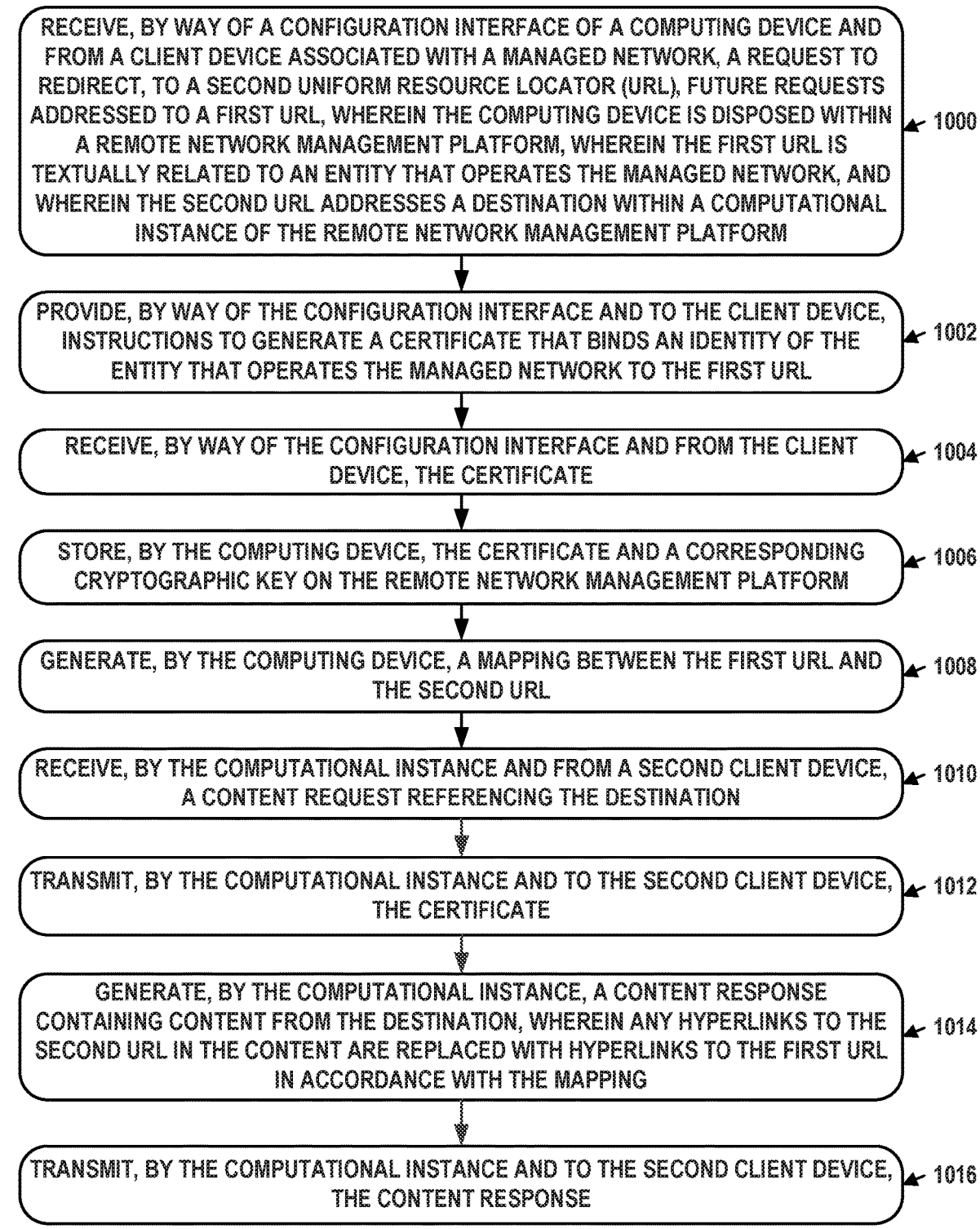
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving, by way of a configuration interface of a computing device and from a client device associated with a managed network, a request to redirect, to a second uniform resource locator (URL), future requests addressed to a first URL. The computing device may be disposed within a remote network management platform. The first URL may be textually related to an entity that operates the managed network and the second URL may address a destination within a computational instance of the remote network management platform.

Block 1002 may involve providing, by way of the configuration interface and to the client device, instructions to generate a certificate that binds an identity of the entity that operates the managed network to the first URL.

Block 1004 may involve receiving, by way of the configuration interface and from the client device, the certificate.

Block 1006 may involve storing, by the computing device, the certificate and a corresponding cryptographic key on the remote network management platform.

Block 1008 may involve generating, by the computing device, a mapping between the first URL and the second URL.

Block 1010 may involve receiving, by the computational instance and from a second client device, a content request referencing the destination.

Block 1012 may involve transmitting, by the computational instance and to the second client device, the certificate.

Block 1014 may involve generating, by the computational instance, a content response containing content from the destination. Any hyperlinks to the second URL in the content may be replaced with hyperlinks to the first URL in accordance with the mapping.

Block 1016 may involve transmitting, by the computational instance and to the second client device, the content response.

In some embodiments, the content request may include an indication that the content request was initially addressed to the first URL. Any hyperlinks to the second URL in the content may be replaced with hyperlinks to the first URL based on the content request including the indication.

In some embodiments, the content request may be a hypertext transfer protocol (HTTP) request. The indication that the content request was initially addressed to the first URL may include the first URL being represented in an HTTP host header of the HTTP request.

In some embodiments, the destination may be a virtual address assigned to a load balancer. The load balancer may be configured to distribute content requests addressed to the virtual address amongst a plurality of server devices, each with access to the content.

In some embodiments, the computational instance may be further configured to: receive a second content request referencing the destination; determine that the second content request contains an indication that the second content request was initially addressed to the second URL and was received from a search engine web crawler; and generate a second content response containing metadata configured to (i) cause the search engine web crawler to omit associating the content with the second URL at a search engine index, and (ii) redirect the search engine web crawler to access the content by way of the first URL.

In some embodiments, the computing device may be further configured to provide instructions to modify a Domain Name System (DNS) record associated with the first URL to cause the DNS to, in response to future DNS requests to look up the first URL, return the second URL.

In some embodiments, the computing device may be further configured to provide instructions to modify a Domain Name System (DNS) record associated with the first URL to cause the DNS to, in response to future DNS requests to look up the first URL, return an internet protocol (IP) address corresponding to the destination.

In some embodiments, generating the mapping between the first URL and the second URL may involve associating the first URL with a file system path that is included in the second URL, and where the file system path is at the destination.

In some embodiments, the first URL may address a subdomain within the managed network, where the destination is a web portal hosted by the computational instance, and where the subdomain is textually related to the content.

In some embodiments, generating the response may involve: parsing the content for hyperlinks; determining that the content contains a hyperlink corresponding to the second URL; and replacing the hyperlink corresponding to the second URL with a hyperlink corresponding to the first URL.

In some embodiments, the computing device may be further configured to receive, by way of the configuration interface and from the client device, a second request to redirect, to a fourth URL, future requests addressed to a third URL, where the third URL is textually related to the entity that operates the managed network, and where the fourth URL addresses a second destination within the computational instance. The computing device may also be configured to generate a second mapping between the third URL and the fourth URL. The computational instance may be further configured to receive a second content request referencing the second destination, and generate a second content response containing second content from the second destination, where any hyperlinks to the fourth URL in the second content are replaced with hyperlinks to the third URL in accordance with the second mapping.

In some embodiments, the computing device may be further configured to provide instructions to configure an identity provider (IdP) to authenticate, using single sign-on (SSO) authentication, client devices associated with the managed network to access, by way of content requests initially addressed to the first URL, the destination. The computational instance may be further configured to, in response to receiving the content request, determine that the second client device has not been authenticated to access the content; determine that the content request was initially addressed to the first URL; based on determining that the second client device has not been authenticated and that the content request was initially addressed to the first URL, provide instructions to the second client device to (i) redirect the second client device to the IdP for SSO authentication and, (ii) after authentication by the IdP, cause the second client device to transmit a second content request including the first URL; receive, from the second client device, the second content request and an authentication token issued by the IdP and indicating successful authentication of the second client device; and in response to receiving the second content request and the authentication token, generate the content response.

In some embodiments, reception, by the second client device, of the response may cause the second client device to display, within an address bar of an application by way of which the content request referencing the destination was generated, the first URL.

In some embodiments, the certificate that binds the identity of the entity of the managed network to the first URL may be a secure socket layer (SSL) or transport layer security (TLS) certificate issued by a certificate authority (CA).

In some embodiments, a system may include a means, disposed within a remote network management platform, for receiving, from a client device associated with a managed network, a request to redirect, to a second uniform resource locator (URL), future requests addressed to a first URL. The first URL may be textually related to an entity that operates the managed network. The second URL may address a destination within a computational instance of the remote network management platform. The system may also include means for providing, to the client device, instructions to generate a certificate that binds an identity of the entity that operates the managed network to the first URL; means for receiving, from the client device, the certificate; and means for storing the certificate and a corresponding cryptographic key on the remote network management platform. The system may additionally include means for generating a mapping between the first URL and the second URL. The system may further include means for receiving, from a second client device, a content request referencing the destination; means for transmitting, to the second client device, the certificate; means for generating a content response containing content from the destination, where any hyperlinks to the second URL in the content are replaced with hyperlinks to the first URL in accordance with the mapping; and means for transmitting, to the second client device, the content response.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
one or more hardware processors; and
a non-transitory memory, the non-transitory memory storing instructions that, when executed by the one or more hardware processors, causes the one or more hardware processors to perform actions comprising:
receiving, from a client device of a managed network, via a configuration interface, a request to map a first uniform resource locator (URL) to a second URL, wherein the first URL has a destination within a computational instance assigned to the managed network, and wherein the second URL is textually related to an entity that operates the managed network;
generating a mapping between the first URL and the second URL;
providing instructions to create a record on a domain name system (DNS) associated with the second URL, wherein the record indicates the mapping of the first URL to the second URL; and
providing instructions to the computational instance to perform operations comprising:
receiving a content request referencing and containing content from the destination;
determining that the content request contains an indication that the content request was initially addressed to the first URL and was received from a search engine web crawler; and
generating a second content response containing metadata configured to:
cause the search engine web crawler to omit associating the content with the first URL at a search engine index; and
redirect the search engine web crawler to access the content by way of the second URL.

2. The system of claim 1, wherein the actions comprise:
providing, to the client device, via the configuration interface, instructions to generate a certificate that binds an identity of the entity that operates the managed network to the second URL; and
receiving, from the client device, via the configuration interface, the generated certificate.

3. The system of claim 2, wherein the actions comprise:
storing the generated certificate and a corresponding cryptographic key on a remote network management platform of the computational instance.

4. The system of claim 1, wherein the computational instance is configured to:
receive, from a second client device, a content request referencing the destination associated with the first URL;
generate a content response containing content from the destination, wherein any hyperlinks to the first URL in the content are replaced with hyperlinks to the second URL in accordance with the mapping; and
transmit, to the second client device, the content response.

5. The system of claim 4, wherein the content request comprises an indication that the content request was initially addressed to the second URL, and wherein any hyperlinks to the first URL in the content are replaced with hyperlinks to the second URL, based on the content request including the indication.

6. The system of claim 1, wherein the actions comprise:
verifying the second URL, comprising:
confirming that the DNS resolves the second URL to an internet protocol (IP) address of a remote network management platform rather than an IP address of the managed network.

7. The system of claim 1, wherein generating the mapping between the first URL and the second URL comprises associating the second URL with a file system path that is included in the first URL, and wherein the file system path is at the destination.

8. The system of claim 1, wherein the destination is a virtual address assigned to a load balancer, and wherein the load balancer is configured to distribute content requests addressed to the virtual address amongst a plurality of server devices, each with access to the content.

9. A method for mapping a first uniform resource locator (URL) to a destination corresponding to a second URL, the method comprising:
receiving, from a client device of a managed network, via a configuration interface, a request to map a first URL to a second URL, wherein the first URL has a destination within a computational instance assigned to the managed network, and wherein the second URL is textually related to an entity that operates the managed network;
generating a mapping between the first URL and the second URL;
providing instructions to create a record on a domain name system (DNS) associated with the second URL, wherein the record indicates the mapping of the first URL to the second URL; and
providing instructions to the computational instance to perform operations comprising:
receiving a content request referencing and containing content from the destination;
determining that the content request contains an indication that the content request was initially addressed to the first URL and was received from a search engine web crawler; and
generating a second content response containing metadata configured to:
cause the search engine web crawler to omit associating the content with the first URL at a search engine index; and
redirect the search engine web crawler to access the content by way of the second URL.

10. The method of claim 9, comprising:
generating, via the configuration interface, a network configuration indicating a plurality of network parameters such that incoming requests addressed to the second URL of the managed network are routed to the destination within the computational instance addressed by the first URL.

11. The method of claim 9, wherein the destination is a virtual address assigned to a load balancer, and wherein the load balancer is configured to distribute content requests addressed to the virtual address amongst a plurality of server devices, each with access to the content.

12. The method of claim 9, comprising:
providing, to the client device, via the configuration interface, instructions to generate a certificate that binds an identity of the entity that operates the managed network to the second URL; and
receiving, from the client device, via the configuration interface, the generated certificate.

13. The method of claim 12, comprising:
storing the generated certificate and a corresponding cryptographic key on a remote network management platform associated with the computational instance.

14. A non-transitory computer-readable medium comprising computer readable code, that when executed by one or more processors, causes the one or more processors to perform operations comprising:
receiving, from a client device of a managed network, via a configuration interface, a request to map a first uniform resource locator (URL) to a second URL, wherein the first URL has a destination within a computational instance assigned to the managed network, and wherein the second URL is textually related to an entity that operates the managed network;
generating a mapping between the first URL and the second URL;
providing instructions to create a record on a domain name system (DNS) associated with the second URL, wherein the record indicates the mapping of the first URL to the second URL; and
providing instructions to the computational instance to configure an identity provider (IdP) to authenticate, using single sign-on (SSO) authentication, client devices associated with the managed network to access, by way of content requests initially addressed to the second URL, the destination, and wherein the computational instance is configured to:
receive, from a client device, a content request referencing the destination;
in response to receiving the content request, determine that the client device has not been authenticated to access the content;
determine that the content request was initially addressed to the second URL;
based on determining that the client device has not been authenticated and that the content request was initially addressed to the second URL, provide instructions to the client device to:
redirect the client device to the IdP for SSO authentication; and
after authentication by the IdP, cause the client device to transmit a second content request including the second URL;
receive, from the client device, the second content request and an authentication token issued by the IdP and indicating successful authentication of the client device, and
in response to receiving the second content request and the authentication token, generate the content response.

15. The non-transitory computer-readable medium of claim 14, wherein the operations comprise:
receiving, from a second client device, a content request referencing the destination associated with the first URL,
generating a content response containing content from the destination, wherein any hyperlinks to the first URL in the content are replaced with hyperlinks to the second URL in accordance with the mapping, and
transmitting, to the second client device, the content response.

16. The non-transitory computer-readable medium of claim 15, wherein the content request includes an indication that the content request was initially addressed to the second URL, and wherein any hyperlinks to the first URL in the content are replaced with hyperlinks to the second URL based on the content request including the indication.

17. The non-transitory computer-readable medium of claim 16, wherein the content request is a hypertext transfer protocol (HTTP) request, and wherein the indication that the content request was initially addressed to the second URL comprises the second URL being represented in an HTTP host header of the HTTP request.

18. The non-transitory computer-readable medium of claim 14, wherein the second URL addresses a subdomain within the managed network, wherein the destination is a web portal hosted by the computational instance, and wherein the subdomain is textually related to the content.

* * * * *